United States Patent [19]

Dhein et al.

[11] Patent Number: 5,089,342
[45] Date of Patent: Feb. 18, 1992

[54] WOOD OR WOOD PRODUCT COATED WITH AN AQUEOUS, AIR-DRYING COATING AGENT

[75] Inventors: Rolf Dhein, Krefeld; Thomas Scholl, Meerbusch; Wolfgang Wellner, Bergisch-Gladbach; Lothar Bäcker, Dormagen, all of Fed. Rep. of Germany

[73] Assignee: Bayer Aktiengesellschaft, Luverkusen, Fed. Rep. of Germany

[21] Appl. No.: 653,020

[22] Filed: Feb. 8, 1991

Related U.S. Application Data

[62] Division of Ser. No. 434,441, Nov. 13, 1989, abandoned.

[30] Foreign Application Priority Data

Nov. 19, 1988 [DE] Fed. Rep. of Germany ....... 3839171

[51] Int. Cl.$^5$ ................... B32B 27/38; C08L 63/00; B05D 3/02
[52] U.S. Cl. ................... 428/413; 428/514; 523/410; 523/407; 427/386; 427/393
[58] Field of Search ................ 523/410; 428/539.1, 428/413, 514

[56] References Cited

U.S. PATENT DOCUMENTS

| | | | |
|---|---|---|---|
| 4,476,261 | 10/1984 | Patzchke et al. | 523/406 |
| 4,686,249 | 8/1987 | Diefenbach et al. | 523/410 |
| 4,704,437 | 11/1987 | Kiessling | 523/410 |
| 4,865,704 | 12/1989 | Saatweber et al. | 523/410 |

Primary Examiner—P. C. Sluby
Attorney, Agent, or Firm—Connolly and Hutz

[57] ABSTRACT

An improved aqueous coating agent for providing a decorative and protective coating for wood or wood products contains as a binder polyacrylate resins having chemically incorporated therein air-drying, unsaturated fatty acid moieties and quaternary ammonium moieties, and said agent is prepared by reacting A) excess polyacrylates containing epoxide groups and having an epoxide group equivalent weight of 200 to 1,300 with
B) drying fatty acids, in an addition reaction with ester formation,
C) reacting at least some of the remaining epoxide groups in the A)-B) reaction product with monoamine ammonium salts which contain an N-H bond in an addition reaction, and dissolving the reaction product obtained from step C) and containing quaternary ammonium groups in water.

1 Claim, No Drawings

WOOD OR WOOD PRODUCT COATED WITH AN AQUEOUS, AIR-DRYING COATING AGENT

This application is a divisional of Ser. No. 434,441, filed on Nov. 13, 1989, now abandoned.

The present invention relates to aqueous, air-drying coating agents based on polyacrylates containing chemically incorporated drying fatty acid radicals and chemically incorporated quaternary ammonium groups, a process for their preparation and their use for coating wood.

BACKGROUND OF THE INVENTION

Water-soluble binders are becoming of increasing interest because of the fact that when they are applied water, which ecologically is entirely acceptable, is predominantly emitted into the environment as the solvent. There has therefore been no lack of attempts to develop high quality binders with water as the solvent. Thus, for example, water-dilutable or water-soluble systems are becoming increasingly available in the field of painting and do-it-yourself lacquers, and here in particular in wood coatings. There is also a great interest in aqueous binders in the industrial field of use. The stricter legal regulations on emission of organic solvents have particularly contributed towards this.

The water-soluble binders are usually alkyd resins which contain lateral free carboxyl groups and, after neutralization of the carboxyl groups with amines, become water-soluble (c.f e.g. AT-PS 180 407, DE-OS 1 917 162, DE-OS 2 323 546 or DE-AS 2 239 094). Neutralization with amines leads to a weakly alkaline pH of the aqueous binders which, in conjunction with the ester groups in the polyester molecule, has the effect of a low stability towards hydrolysis. This is also manifested in the limited storage stability of the aqueous lacquer solutions, which precipitate after the pH gradually falls.

These binders moreover frequently contain considerable proportions of water-miscible organic co-solvents, which escape together with the other volatile constituents—water and amine—during drying. The ecological advantage which these binders have on the basis of their water-solubility is in this way reduced. A decrease in the co-solvent content as a rule impairs the dilution properties of the binders. Lacquers prepared from these have only low binder contents.

Aqueous binders based on polyacrylate are also already known (c.f. e.g. EP-A-0 218 906, DE-OS 2 347 999, DE-OS 2 357 152, DE-OS 2 507 842 and DE-OS 2 531 802). The coating agents of these previous publications are those based on anionically modified polymers, i.e. polymers containing carboxylate groups, which, in combination with a hardening agent, in particular, are thermosetting.

All such coating agents are largely unsuitable, in particular, for coating wood, since wood lacquers should as far as possible be hardenable without heat treatment, and in particular since, when used for coating wood, the amines which are contained in the lacquer and form counter-ions to the incorporated carboxylate groups are neutralized by the vegetable tannins which are contained naturally in wood and are described in Ullmanns Encyclopädie der technischen Chemie (Ullmanns Encyclopaedia of Industrial Chemistry), 3rd edition, 1960, volume 11, page 593 et seq. as compounds which are of complicated structure and contain numerous phenolic hydroxyl and carboxyl groups. Coagulation of the binder consequently rapidly occurs on penetration into wood.

BRIEF DESCRIPTION OF THE INVENTION

The object on which the present invention was based was to provide novel aqueous air-drying coating agents which are particularly suitable for the treatment of wood and derived timber products. The coating agents should moreover contain only small amounts of organic solvents, not imitate amines, be capable of being applied to wood by the customary processes of coating technology and guarantee an adequate depth of penetration and contact time.

It has been possible to achieve this object by providing the coating agents according to the invention which are described in more detail below.

The coating agents according to the invention are based on polyacrylate salts which contain incorporated air-drying unsaturated fatty acid radicals and quaternary ammonium groups. Because of the presence of these quaternary ammonium groups. Because of the presence of these quaternary ammonium groups, the coating agents according to the invention differ from the coating agents according to the previous German Patent Application P 37 38 932.7, which has been filed by the common assignee, which are based on polyacrylate salts with incorporated tertiary ammonium groups.

DETAILED DESCRIPTION OF THE INVENTION

The invention thus relates to aqueous coating agents based on polyacrylate salts, characterized in that the polyacrylate salts contain incorporated air-drying unsaturated fatty acid radicals and quaternary ammonium groups.

The invention particularly relates to the preferred coating agents of this type, which contain a water-soluble air-drying binder and if appropriate the auxiliaries and additives customary in lacquer technology, characterized in that the binder is a polyacrylate having a molecular weight of more than 1,000 and containing 5 to 40 wt. % chemically incorporated drying fatty acids (calculated as R—COO—, R=hydrocarbon radical of the drying fatty acid) and 50 to 200 milliequivalents per 100 g solid of chemically incorporated quaternary ammonium groups.

The invention also relates to a process for the preparation of such coating agents, which is characterized in that A) polyacrylates containing epoxide groups and having an epoxide group equivalent weight of 200 to 1,300 are reacted with B) drying fatty acids, if appropriate mixed with nondrying fatty acids, in the context of an addition reaction which proceeds with ester formation, C) all or some of the epoxide groups still present in the reaction product according to B) are reacted with ammonium salts which contain an N—H bond and are based on tertiary monoamines, in the sense of an addition reaction, D) the reaction product obtained according to C) and containing quaternary ammonium groups is dissolved in water, E) if appropriate auxiliaries and additives known from lacquer technology being incorporated into the solution obtained according to D) at any desired time during its preparation or after its preparation, and the nature and proportions of the starting components being chosen such that the binder dissolved in water has the abovementioned molecular weight and the abovementioned content of drying fatty acids and ammonium groups.

The invention also relates to the use of the coating agents according to the invention for coating wood or derived timber products.

A particular advantage of these new binders is that they give only minor discolorations, especially on light-coloured woods. This was not to be expected, since in the literature, e.g. Ullmanns Encyclopädie der technischen Chemie (Ullmans Encyclopaedia of Industrial Chemistry), vol. 11, p. 771 et seq., Urban-Schwarzenberg-Verlag, it is pointed out that the lignin contained in wood particularly tends to undergo colour reactions with substituted amines. This is also utilized for the detection of lignin.

The polyacrylates containing epoxide groups and used as starting materials A) have an epoxide equivalent weight of 200 to 1,300, preferably 300 to 700, and a molecular weight Mw of more than 700, preferably of 1,000 to 5,000.

They are prepared by free radical polymerization, which is known per se, of derivatives of methacylic and/or acrylic acid. These are e.g. methyl methacrylate, methyl acrylate, n- and iso-butyl, n-hexyl, cyclohexyl, 2-ethylhexyl, 2-hydroxyethyl, hydroxypropyl, 2-ethoxyethyl and 2-butoxyethyl methacrylate and 2-hydroxyethyl, hydroxypropyl, 2-methoxyethyl and 2-butoxyethyl acrylate.

Vinylically unsaturated hydrocarbons, such as styrene and vinyltoluene, can moreover also be used as monomers. The epoxide equivalents described are achieved by using epoxidized monomers, such as e.g. glycidyl acrylate or glycidyl methacrylate.

The free radical copolymerization procedure is known to the expert and is described in detail in the customary technical literature, such as e.g. Houben-Weyl, vol. 14/1, p. 24 et seq., 4th ed., Georg Thieme Verlag, Stuttgart. A detailed explanation is therefore dispensed with at this point.

The drying fatty acids B) are the known naturally occurring or synthetic drying fatty acids which contain two or more double bonds and up to 22, preferably 14 to 18, carbon atoms. Examples of such fatty acids are linoleic acid, linolenic acid, elaeostearic acid, parinaric acid, arachidonic acid, clupanodonic acid, misic acid, ricinene fatty acid and conjugated polyunsaturated fatty acids, such as e.g. ®Prifac 7967, ®Prifac 7968 and ®Prifac 7969. The last three acids mentioned are synthetic conjugated unsaturated fatty acids with 18 carbon atoms. These acids are commercial products from Unichema Chemie GmbH.

In carrying out the process according to the invention, the polyunsaturated fatty acids mentioned as examples can of course also be employed as a mixture with monounsaturated and/or saturated fatty acids.

In the first stage of the process according to the invention, the polymers A) containing epoxide groups are reacted with the fatty acids or fatty acid mixtures B) at 80° to 120° C., preferably 100° to 120° C., under an inert gas atmosphere. During this reaction the fatty acid is bonded to the copolymer molecule by opening of the epoxide ring and ester formation. The amount of drying fatty acids is otherwise chosen so that 5 to 40, preferably 10 to 30 wt. % incorporated drying fatty acid radicals (calculated as R—COO—, R=hydrocarbon radical of the drying fatty acids) are present in the binders according to the invention which are finally obtained.

The epoxide groups which still remain in the reaction products thus obtained are then reacted in a second reaction step at least partly, preferably completely, with a salt of a tertiary amine of the general formula

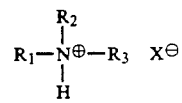

wherein $R_1$, $R_2$ and $R_3$ represent identical or different radicals and denote alkyl radicles which have up to 8, preferably 1 to 4, carbon atoms and optionally contain a hydroxyl substituent or ether bridges, and $X^\ominus$ represents the anion of an organic or inorganic acid.

Examples of amines which are suitable for the amine salt preparation are trimethylamine, triethylamine, N,N-dimethylethanolamine, N,N-diethylethanolamine, N-methyldiethanolamine, N-butyldiethanolamine, 3-dimethylamino-1-propanol, 1-dimethylamino-2-propanol and triethanolamine.

The salts of N,N-dimethylethanolamine are particularly suitable and therefore preferred because the binders which are prepared therefrom and contain quaternary ammonium groups have a good solubility in water.

The nature of the acid HX present in chemically bonded form in the salts is largely irrelevant for the feasibility of the process according to the invention. The salts of the formula mentioned based on acetic acid, for example, are particularly suitable.

In the reaction last mentioned, a procedure is preferably followed in which the intermediate product resulting from the first reaction stage is reacted with the equivalent amount of such a salt at 60° to 100° C. By opening of the epoxide rings, polymers with incorporated quaternary ammonium groups are in this way formed by addition of the tertiary ammonium ions.

The excess of polymers A) containing epoxide groups and employed in the first stage of the process according to the invention over the fatty acids or fatty acid mixtures B), i.e. the amount of excess epoxide groups in the reaction product obtained here, and the amount of amine salt incorporated in the second reaction stage and of the quaternary ammonium groups resulting therefrom are otherwise chosen such that 50 to 200, preferably 50 to 120 milliequivalents per 100 g solid of chemically incorporated quaternary ammonium groups are present in the binders finally obtained. The amount of ammonium groups must in all cases be sufficient to guarantee the water-solubility of the binders according to the invention.

Water is then subsequently added for the purpose of preparing aqueous solutions of the binders according to the invention.

The auxiliaries and additives known from lacquer technology, such as, for example, pigments, fillers, flow control auxiliaries, drying agents or auxiliary solvents, can be present in the coating agents according to the invention. It is to be emphasized, however, that it is one of the advantages of the coating agents according to the invention that their content of auxiliary solvents can be kept very low, in general below 15%, based on the ready-to-use lacquer. Examples of suitable auxiliary solvents are butylglycol, methoxypropanol, ethylene glycol monomethyl ether, ethylene glycol monoethyl ether, butoxypropanol or mixtures of such solvents.

The auxiliaries and additives can be incorporated either into the starting materials for the preparation of the binders according to the invention or into the aqueous solutions finally obtained. The auxiliary solvents which are present if appropriate are often already employed during preparation of the copolymers A), whereas the drying agents are in general incorporated into the coating agents only after they have been prepared.

The coating agents according to the invention are paints with widely varying uses which can be processed by all the known methods of coating technology, and are particularly suitable for the preparation of wood or derived timber products. In contrast to dispersions, the air-drying wood lacquers in the form of an aqueous solution can be processed like previously known lacquer solutions, bond intensively to the wood substrates under the influence of atmospheric oxygen, dry very rapidly and produce films with high quality mechanical properties. They at most release only a small amount of auxiliary solvents to the environment and contain no amines and neutralizing agents which are volatile during film-forming.

The parts and percentages stated in the following examples in each case relate to the weight.

PREPARATION OF THE CLEAR LACQUERS

The aqueous binder solutions obtained by the examples described were adjusted to a brushable consistency by addition of deionized water. To prevent formation of a skin, 1% ®Ascinin R conz—an oxime-based skin prevention agent from Bayer AG—was added to the solutions. Siccativation was carried out with Co-octoat aqua—a solution containing 7% bonded cobalt from Gebr. Borchers AG. The binder according to example 1 was siccativated with 0.04% and the binder obtained from example 2 with 0.02% cobalt based on the solid binder. For testing as lacquers, the solutions were applied in a wet film thickness of 180 μm to wood and glass plates and were investigated in respect of drying, optical appearance and resistance to condensed water. The water resistance was checked by placing cotton-wool pads soaked with water on films 7 days old and covering the contact area with a Petri dish until the surface changed visibly.

COMPARISON 1

Preparation of a Copolymer Containing Epoxide Groups

A mixture of 1,018.9 parts styrene, 526.2 parts methyl methacrylate, 41.9 parts butyl acrylate, 743.7 parts glycidyl methacrylate, 70.8 parts t-butyl peroctoate and 23.8 parts dodecanethiol was added dropwise to 1,050 parts butylglycol at 110° C. in the course of 2.5 hours. After the mixture had after-reacted at 110° C. for 3 hours, the reaction was continued by 3 additions of in each case 4.17 parts t-butyl peroctoate until the monomers had reacted completely. After the last addition, the mixture was stirred at 110° C. for a further 2 hours. Testing for complete conversion was by determination of the flow viscosity in accordance with DIN 53 211, 40% in dimethylformamide, and by determination of the solids content. For this, a thin-layered sample is heated at 120° C. for 1 hour and the non-volatile constituents are then weighed. After the third addition of peroctoate, the solids content and viscosity proved to be largely constant. The solids content was 73.7% and the viscosity was 30 sec (DIN 53 211). The theoretical epoxide equivalent weight is 465.6.

2,483.5 parts of the 73.7% copolymer solution in butylglycol were reacted with 271.8 parts Prifac 7968 at 120° C. up to an acid number of 1. After 2 hours, an AN of 0.8 was measured. The solids content was 74.2%. The viscosity when diluted to 40% with dimethylformamide was 29 sec in accordance with DIN 53 211. The residual epoxide content was 1.56% and thus deviates only slightly from the theoretical value, which was calculated as 1.60%. The reaction was carried out under an $N_2$ atmosphere.

158.7 parts diethylamine were initially introduced into a stirred apparatus fitted with a reflux condenser, dropping funnel which can be heated and contact thermometer. The amine was heated up to 50° C. 1,800 pts. of the 74.2% solution mentioned was then allowed to run via the heated dropping funnel into the amine initially introduced in the course of 30 min. During this procedure, the temperature rose to 100° C. After the addition, the mixture was stirred at 100° C. for a further 4 h. 31.4 pts. diethylamine, which were initially introduced in excess, were distilled off under reduced pressure. The resulting polymer contained 115.5 milliequivalents per 100 g solid of amino groups. The solids content was 77.6%. The viscosity was measured as 39 sec in dimethylformamide in accordance with DIN 53 211.

After neutralization of 86.1% of the amino groups present with formic acid, the mixture was diluted to a solids content of 24.4% by addition of water in portions. A clear solution was obtained.

COMPARISON 2

Preparation of a Copolymer Containing Epoxide Groups

By the process described in example 1, 435.5 parts styrene, 510.9 parts methyl methacrylate, 1,359.2 parts glycidyl methacrylate, 64.8 parts t-butyl peroctoate and 55.6 parts dodecanethiol were copolymerized in 1,049.9 parts methoxypropanol in the first stage. As in example 1, peroctoate additions of in each case 4.02 parts were made in accordance with the same time plan. After a total of 6 additions, the viscosity and the solids content were largely constant.

The solids content of the resulting solution was determined as 73.3% and the viscosity as 77 sec at 40% in methoxypropanol in accordance with DIN 53 211. The epoxide equivalent weight was calculated as 256.

2,707.5 parts of the resulting polymer solution were reacted with 943 parts soya oil fatty acid up to an acid number of 0.3 under an inert gas atmosphere by the process as described in example 1. The reaction time was 4.5 hours. The reaction product had a solids content of 78.8% and a viscosity of 53 sec, measured at 40% in methoxypropanol. The epoxide content of the solution was 1.05%. This corresponds to an epoxide equivalent weight of 1,200.8.

238,0 parts diethylamine were then reacted with 2,500 parts of the 78.8% solution mentioned. After 3 hours at 100° C., a solids content of 78.5% was measured. The viscosity was 66 sec at 40% in methoxypropanol. The excess amine employed was removed by distillation under a water pump vacuum.

The resulting polymer had a content of amino groups of 93.4 milliequivalents per 100 g solid. After neutralization to the extent of 85% of the amino groups with acetic acid, the mixture was diluted to 20.1% by addition of water in portions. A clear solution was obtained, which can be diluted in a clear form to 10% by further addition of water.

EXAMPLE 1

Preparation of a Copolymer Containing Epoxide Groups 738.7 parts styrene, 330 parts methyl methacrylate, 35 parts butyl acrylate, 931 parts glycidyl methacrylate, 45.7 parts azobisisobutyronitrile and 19.9 parts dodecanethiol were copolymerized in 899.8 parts methoxypropanol by the process described in comparison experiment 1. After an after-reaction at 100° C. for 9 hours, the solids content and viscosity were largely constant.

The solids content was 70.4% and the viscosity according to DIN 53 211 was 63 sec, measured at 40% in methoxypropanol.

PROCESS ACCORDING TO THE INVENTION 2,795.1 parts of the 70.4% copolymer solution in methoxypropanol were reacted with 284.6 parts Prifac 7968 at 120° C. up to an acid number of 0.7. The solids content of the reaction mixture was 73.2%. The viscosity of the solution diluted to 40% with methoxypropanol was 54 sec in accordance with DIN 53 211. 296.1 parts N,N-dimethylethanolamine were initially introduced into an apparatus as described in the comparison experiments and reacted with 199.6 parts acetic acid at 20° to 30° C. to give the acetate. The amine acetate formed was heated up to 60° C., and 2,000 parts of the previously prepared 73.2% solution were added in the course of 2 h. The temperature was then increased to 100° C. in the course of 30 minutes. After the mixture had after-reacted at 100° C. for 90 minutes, a viscosity of 265 sec was measured at 40% in methoxypropanol in accordance with DIN 53 211.

The mixture was diluted to a solids content of 33.4% by addition of water and 2% Ascinin R conz, based on the polymer. The resulting aqueous solution could be diluted in a clear form down to 10% with water. The pH of the 10% solution was 8.57. Even after acidification by addition of further acid, no coagulation was to be observed. The resulting polymer had a content of quaternary ammonium groups of 175.9 milliequivalents per 100 g solid.

EXAMPLE 2

Preparation of a Copolymer Containing Epoxide Groups 672.1 parts styrene, 271.4 parts methyl methacrylate, 34.5 parts butyl acrylate and 1,070.5 parts glycidyl methacrylate were copolymerized with 45 parts azobis-isobutyronitrile and 19.6 parts dodecanethiol in 886.9 parts methoxypropanol by the process described in comparison experiment 1. After the mixture had after-reacted at 110° C. for 10 hours, a solids content of 71.7% was measured. The viscosity was 73 sec, measured at 40% in methoxypropanol in accordance with DIN 53 211.

PROCESS ACCORDING TO THE INVENTION 3,000 parts of the 71.7% copolymer solution in methoxypropanol were reacted with 561.8 parts Prifac 7968 at 120° C. in the course of 2.5 h up to an acid number of 0.1. The reaction product had a solids content of 74.0% and a viscosity of 77 sec, measured at 40% in methoxypropanol in accordance with DIN 53 211.

261.6 parts N,N-dimethylethanolamine were neutralized with 176.3 parts acetic acid and reacted with 2,000 parts of the previously prepared 74.0% polymer solution by the process described above. The polymer obtained in this reaction had a solids content of 82.9% and a viscosity of 131 sec, measured at 40% in methoxypropanol in accordance with DIN 53 211. The polymer contains 144 milliequivalents of quaternary ammonium groups, based on 100 g solid.

RESULTS OF THE LACQUER TESTING

The clear lacquer obtainable according to comparison 1 dries in the course of 2 hours, whereas that according to comparison 2 dries in about 2.5 hours. Clear lacquers according to example 1 and 2 dry in 1.5 hours.

Lacquerings which adhere and penetrate well and which visually exhibit a clear emphasis of the wood grain were obtained on wood. This effect is described as inflaming by the expert and is entirely desirable because of its decorative effect on wood.

Lacquerings of the comparison experiments applied to wooden boards of pine and spruce lead to a yellowish discoloration after the drying operation. In contrast, the coatings according to example 1 and 2 show no discolorations.

What is claimed is:

1. A coated wood or wood product article which comprises a wood or wood product substrate coated with an aqueous, air-drying coating agent containing a water-soluble, air-drying binder wherein the binder is a polyacrylate having a molecular weight of more than 1,000 and having 5 to 40 weight per cent of chemically incorporated drying fatty acids, calculated as R—COO— where R is the hydrocarbon portion of the drying fatty acid, and 50 to 200 milliequivalents per 100 grams of solid of chemically incorporated quaternary ammonium moieties which coating agent has been prepared by a process which comprises reacting A) excess polyacrylate containing epoxide groups and having an epoxide group equivalent weight of 200 to 1,300 with B) drying fatty acids, in an addition reaction with ester formation, C) reacting at least some of the remaining epoxide groups in the A)-B) reaction product with monoamine ammonium salts which contain one N—H bond in an addition reaction, and D) dissolving the reaction product obtained from step C) and containing quaternary ammonium groups in water.

* * * * *